United States Patent
Miller, II et al.

(10) Patent No.: US 10,660,155 B2
(45) Date of Patent: *May 19, 2020

(54) COLLECTING AND ANALYZING DATA IN A DISTRIBUTED SENSOR NETWORK

(71) Applicant: AT&T Intellectual Property I, L.P., Atlanta, GA (US)

(72) Inventors: Robert Raymond Miller, II, Convent Station, NJ (US); Gregory T. Vesonder, Boonton Township, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 592 days.

This patent is subject to a terminal disclaimer.

(21) Appl. No.: 15/069,067

(22) Filed: Mar. 14, 2016

(65) Prior Publication Data
US 2016/0198522 A1 Jul. 7, 2016

Related U.S. Application Data

(63) Continuation of application No. 13/706,857, filed on Dec. 6, 2012, now Pat. No. 9,288,611.

(51) Int. Cl.
*H04L 29/08* (2006.01)
*H04W 4/38* (2018.01)
(Continued)

(52) U.S. Cl.
CPC .......... *H04W 84/18* (2013.01); *H04L 67/12* (2013.01); *H04W 4/38* (2018.02);
(Continued)

(58) Field of Classification Search
CPC .............. H04W 4/006; G01R 29/12
(Continued)

(56) References Cited

U.S. PATENT DOCUMENTS 5,946,083 A 8/1999 Melendez et al.
5,950,712 A 9/1999 Gates et al.
(Continued)

FOREIGN PATENT DOCUMENTS

EP 0994582 10/1998
EP 1367846 12/2003

OTHER PUBLICATIONS

Cell Phone Tower Mounted and Standard Meteostation Data Four Seasons Inter Comparison Pub. on or before Dec. 5, 2012 (Year: 2012).*

(Continued)

*Primary Examiner* — Iqbal Zaidi
(74) *Attorney, Agent, or Firm* — Hartman & Citrin LLC

(57) ABSTRACT

Concepts and technologies are disclosed herein for collecting and analyzing data in a distributed sensor network. The distributed sensor network can include a number of distributed sensor systems having data sources such as sensors, communication equipment, and/or other systems and components. The distributed sensor systems also can include lighting systems, if desired. The distributed sensor systems can collect data from the data sources and provide the data to a local or remote entity such as a data analysis engine. The data analysis engine can request data from the distributed sensor systems, receive the data, and analyze the data for various purposes.

20 Claims, 6 Drawing Sheets

(51) Int. Cl.
*H04W 84/18* (2009.01)
*H04W 52/02* (2009.01)

(52) U.S. Cl.
CPC ......... *H04W 52/0206* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/21* (2018.01)

(58) Field of Classification Search
USPC ........................... 324/457; 455/500; 705/75; 370/252–339
See application file for complete search history.

(56) References Cited

U.S. PATENT DOCUMENTS

| | | | |
|---|---|---|---|
| 6,674,966 | B1 | 1/2004 | Koonen et al. |
| 6,930,596 | B2 | 8/2005 | Kulesz et al. |
| 7,049,952 | B2 | 5/2006 | Kulesz et al. |
| 7,834,754 | B2 | 11/2010 | Kulesz et al. |
| 8,200,239 | B2 | 6/2012 | Mia et al. |
| 8,270,975 | B2 | 9/2012 | Kim et al. |
| 2002/0130808 | A1* | 9/2002 | Fukushima ............ H01P 1/067 342/75 |
| 2004/0012491 | A1 | 1/2004 | Kulesz et al. |
| 2005/0206506 | A1 | 9/2005 | Kulesz et al. |
| 2006/0187017 | A1 | 8/2006 | Kulesz et al. |
| 2009/0300525 | A1* | 12/2009 | Jolliff ................ H04M 1/72544 715/764 |
| 2011/0320130 | A1 | 12/2011 | Valdes et al. |
| 2014/0292522 | A1 | 10/2014 | Schechter |
| 2016/0198522 | A1* | 7/2016 | Miller, II ................ H04W 4/38 370/241.1 |

OTHER PUBLICATIONS

Cell Phone Tower Mounted and Standard Meteostation Data Four Seasons Inter Comparison (Year: 2012).* textually.org, all about texting, SMS and MMS: search for: Radiation Detectors in Your Cell Phone search results: <http://www.textually.org/textblog/mt_search.php?IncludeBlogs=1&search=RADIATION+DETECTORS+IN+YOUR+CELL+PHONE> [Accessed Dec. 5, 2012].

Bakhtin, R. et al., "Cell Phone Tower Mounted Meteostation and Standard Meteostation Data Four Seasons Inter Comparison," <http://www.wmo.int/pages/prog/www/IMOP/publications/IOM-109_TECO-2012/Session1/P1_14_Koldaev_Cell_phone_tower_meteostation.pdf> (2012) [Accessed Dec. 5, 2012].

U.S. Office Action dated Jan. 14, 2015 in U.S. Appl. No. 13/706,857.

U.S. Office Action dated May 20, 2015 in U.S. Appl. No. 13/706,857.

U.S. Notice of Allowance dated Oct. 22, 2015 in U.S. Appl. No. 13/706,857.

U.S. Notice of Allowance dated Nov. 2, 2015 in U.S. Appl. No. 13/706,857.

* cited by examiner

COLLECTING AND ANALYZING DATA IN A DISTRIBUTED SENSOR NETWORK

CROSS-REFERENCE TO RELATED APPLICATIONS

This application is a continuation of and claims priority to U.S. patent application Ser. No. 13/706,857, entitled "Collecting and Analyzing Data in a Distributed Sensor Network," filed Dec. 6, 2012, now U.S. Pat. No. 9,288,611, which is incorporated herein by reference in its entirety.

BACKGROUND

This application relates generally to data collection and analysis. More specifically, the disclosure provided herein relates to collecting and analyzing data in a distributed sensor network.

Usage of cellular and/or other mobile communications network services has increased. In the case of cellular networks in particular, the growth in use of these networks has created some challenges with regard to capacity. In particular, overlap between cells can limit the number of users that can be simultaneously supported by a particular cellular tower. This problem can be particularly pronounced with macro cells, which may cover a large geographic area. Because of limited availability of frequencies for cellular communications, and because overlap of cells may further limit the ability to support a growing number of users, cellular network capacity challenges can cause dropped calls and/or other communication problems for users.

Macro cells also can pose other challenges for network operators. In particular, many macro cells support communications in large geographic areas. For example, some towers may support a geographic area that may have a radius over one or more miles. The network reporting mechanisms of the cellular equipment can provide a wealth of useful information. Some of the information, however, may not be useful since network operators may be able to garner only a limited understanding of a geographic area with which the data is associated. Thus, data indicating a number of users communicating via a particular macro cell may provide little useful information for network operators as geographic areas associated with a number of overlapping and/or adjacent cells may encompass an extensive geographic area.

SUMMARY

The present disclosure is directed to collecting and analyzing data in a distributed sensor network. The distributed sensor network can include a number of distributed sensor systems associated with respective coverage areas. According to various embodiments, the coverage areas of the distributed sensor systems can be limited to a radius of about fifty to one hundred feet and may therefore be referred to as a "micro cell." The distributed sensor systems can include wireless transceivers for sending and receiving wireless communications associated with the coverage area. Thus, the distributed sensor systems can collectively provide cellular communications to a number of mobile devices at or near the coverage areas. Because the coverage areas associated with the distributed sensor systems can be small, relative to macro cells and/or other cellular network equipment, overlap between cells can be reduced, and as a result the user experience during communications can be improved.

The distributed sensor systems also can include various data sources such as sensors, location components, and/or various other components. The distributed sensor systems can collect data from the data sources and provide the data to a local or remote analysis entity. In some embodiments, the distributed sensor systems can perform onboard processing of the data and transmit the processed data, or raw data, to a remote data analysis engine or other data analysis entity. In some embodiments, these and/or other operations of the distributed sensor systems can be controlled by a controller associated with the distributed sensor systems. The controller can include a data collection application for receiving and/or responding to requests for data and/or for generating and transmitting data to various entities. The distributed sensor systems also can include lighting systems such as high efficiency and/or eco-friendly lighting systems that can consume limited amounts of energy. Thus, some embodiments of the concepts and technologies disclosed herein support various power conservation strategies of network operators.

The distributed sensor network also can include a data analysis engine, which can be executed and/or hosted, in some embodiments, by a server computer. The data analysis engine can be configured to request data from the distributed sensor systems, to receive the data, and to analyze the data for various purposes. In some embodiments, the data analysis engine is configured to output data analysis results as output that can be made available to various systems, hosted by the data analysis engine, transmitted to one or more consumers, and/or used for other purposes. The data analysis engine also can communicate with billing and/or charging systems to bill or charge consumers of the output for the data.

According to one aspect of the concepts and technologies disclosed herein, a system is disclosed. The system can include a processor and a memory that stores computer-executable instructions. Execution of the computer-executable instructions by the processor can cause the processor to perform operations including determining if data for analysis during a data analysis operation is available, obtaining the data from a distributed sensor system if a determination is made that the data for analysis is not available, analyzing the data in a data analysis operation, and outputting results of the data analysis operation.

In some embodiments, execution of the computer-executable instructions by the processor can cause the processor to perform operations further including obtaining the data from the distributed sensor system by generating a data request specifying the data, transmitting the data request to the distributed sensor system, and receiving the data from the distributed sensor system. The distributed sensor system also can include a communications component that supports cellular communications in a coverage area associated with the distributed sensor system, a lighting system that illuminates a portion of the coverage area, and two or more data sources that generate the data.

In some embodiments, the distributed sensor system also can include a temperature sensor, a wind sensor, a pressure sensor, and an air quality sensor. The distributed sensor system also can include an image system that captures images at the distributed sensor system, and a sound system that captures audio at the distributed sensor system. In some embodiments, the distributed sensor system also can include a spectrum sensor that detects available and used frequency spectrum at the coverage area. The distributed sensor system also can include a radome that covers the two or more data sources, and an environmental control device that heats and cools a portion of the distributed sensor system. In some embodiments, the lighting system is located within the radome. The lighting system can include a light emitting diode.

According to another aspect of the concepts and technologies disclosed herein, a method is disclosed. The method can include beginning a data analysis operation at a server computer executing a data analysis engine, obtaining, at the server computer, data from a distributed sensor system, analyzing, at the server computer, the data in a data analysis operation, and outputting, at the server computer, results of the data analysis operation.

In some embodiments, beginning the data analysis operation can include receiving a request to analyze data. In some embodiments, obtaining the data can include identifying data to be analyzed during the data analysis operation, generating a data request specifying the data, transmitting the data request to the distributed sensor system, and receiving the data from the distributed sensor system. Receiving the data from the distributed sensor system can include receiving, from the distributed sensor system, sensor data including data collected from a sensor at the distributed sensor system, and spectrum data specifying spectrum usage at a coverage area associated with the distributed sensor system.

In some embodiments, the data request can specify an instance of data to be collected at the distributed sensor system. Receiving the data from the distributed sensor system can include receiving, from the distributed sensor system, spectrum data specifying spectrum usage at a coverage area associated with the distributed sensor system, and utilization data specifying available and used resources at the distributed sensor system. In some embodiments, the data request can specify a category of data to be collected at the distributed sensor system, and the category of data can include two or more instances of data. In some embodiments, the category of data can include weather data, and the two or more instances of data can include temperature data, pressure data, wind data, and radiation data.

According to yet another aspect, a computer storage medium is disclosed. The computer storage medium can have computer-executable instructions stored thereon. The computer-executable instructions, when executed by a processor, can cause the processor to perform operations including obtaining data from a distributed sensor system including two or more data sources, the data including data obtained at the two or more data sources, analyzing the data during a data analysis operation, and outputting results of the data analysis operation.

In some embodiments, the computer-executable instructions can include that, when executed by the processor, cause the processor to perform operations further including identifying data to be analyzed during the data analysis operation, generating a data request specifying the data, transmitting the data request to the distributed sensor system, and receiving the data from the distributed sensor system in a data response. In some embodiments, receiving the data from the distributed sensor system can include receiving, from the distributed sensor system, sensor data including data collected from a sensor at the distributed sensor system, spectrum data specifying spectrum usage at a coverage area associated with the distributed sensor system, and utilization data specifying available and used resources at the distributed sensor system. The computer-executable instructions also can include computer-executable instructions that, when executed by the processor, cause the processor to perform operations further including generating an instruction for charging a recipient of the results of the data analysis operation.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
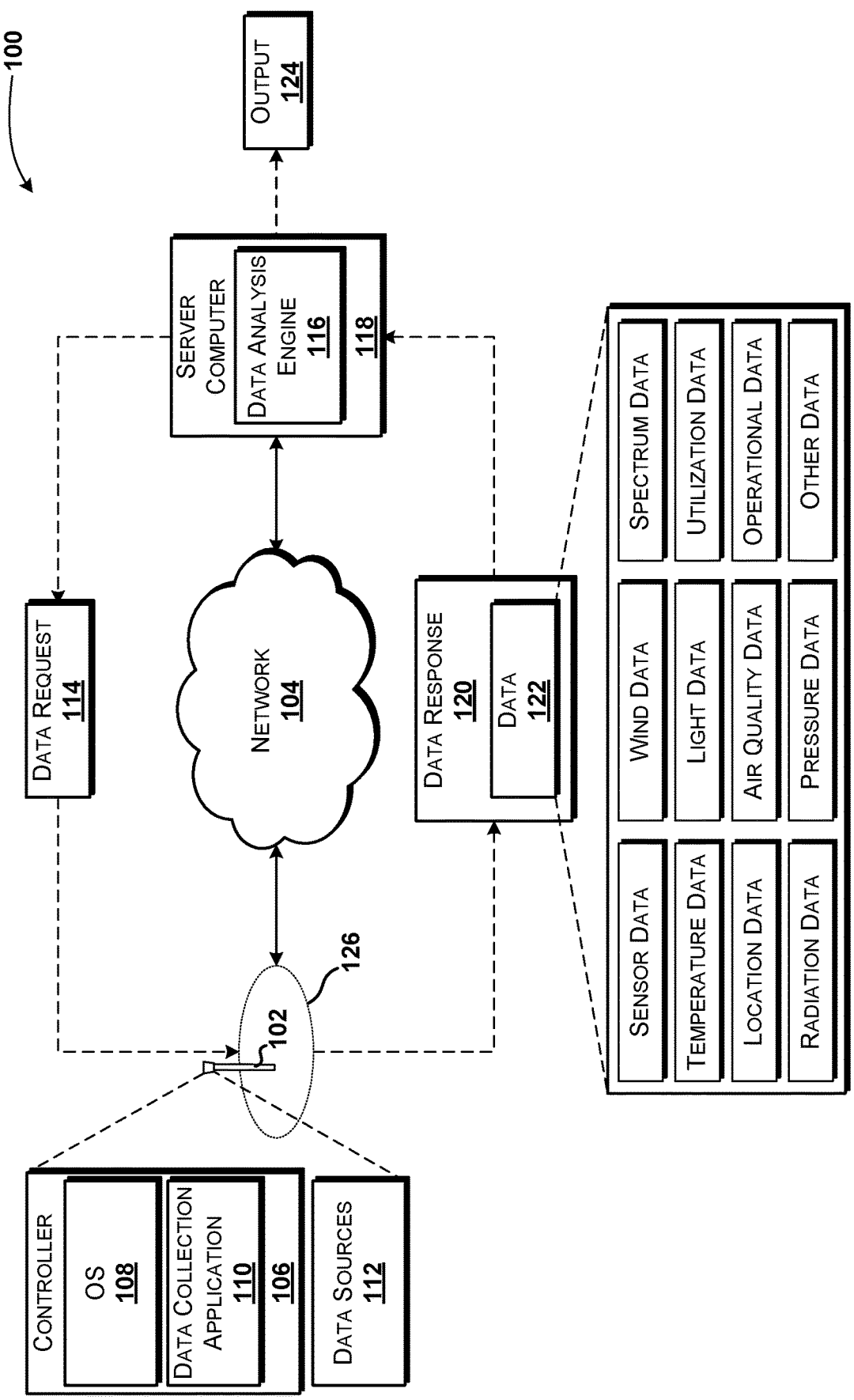
FIG. 1 is a system diagram illustrating a distributed sensor network, according to an illustrative embodiment of the concepts and technologies disclosed herein.

The following detailed description is directed to collecting and analyzing data in a distributed sensor network. The distributed sensor network can include a number of distributed sensor systems. The distributed sensor systems can include communications equipment for supporting wireless communications within respective coverage areas. According to various embodiments, the coverage areas of the distributed sensor systems can be limited to a radius of about ten feet to about one or two thousand feet. Thus, the distributed sensor systems can provide functionality associated with a "micro cell" in some embodiments. The distributed sensor systems also can include various data sources such as sensors, location components, systems, and/or various other components such as location components, sound sensors, temperature sensors, wind sensors, air quality sensors, video systems, imaging systems, or the like. The distributed sensor systems can collect data from the data sources and provide the data to a local or remote analysis entity. The distributed sensor systems also can include lighting systems such as light emitting diode ("LED") lighting systems and/or other lighting systems.

According to some embodiments, the distributed sensor systems can perform onboard processing of data collected or generated by the data sources. The distributed sensor systems can transmit the processed or raw data to a remote data analysis engine or other entity. The data can be provided to the entity as or embedded within a data response. In some embodiments, various functions of the distributed sensor systems can be controlled by a remote or integrated controller associated with the distributed sensor systems. The controller can include a data collection application for receiving and/or responding to requests for data and/or for generating and transmitting data to various entities.

The distributed sensor systems can communicate with a data analysis engine. The data analysis engine can be executed and/or hosted by a server computer that executes as a part of and/or in communication with the distributed sensor network. The data analysis engine can be configured to request data from the distributed sensor systems, to receive the data, and to analyze the data for various purposes. In some embodiments, the data analysis engine is configured to output data analysis results as output that can be made available to various systems, hosted by the data analysis engine, transmitted to one or more consumers, and/or used for other purposes. The data analysis engine also can communicate with billing and/or charging systems to bill or charge consumers of the output for the data.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of a distributed sensor network 100 according to various embodiments of the concepts and technologies disclosed herein will be described. The distributed sensor network 100 shown in FIG. 1 includes a distributed sensor system 102 operating in communication with and/or as a part of a communications network ("network") 104. An example architecture of the distributed sensor system 102 is illustrated and described in more detail below with reference to FIG. 2. Briefly, the distributed sensor system 102 can include a controller 106; a pole, mounting surface, and/or other hardware for locating the distributed sensor system 102 at a desired coverage area; one or more sensors and/or other components for collecting data; and/or other components and/or systems.

The controller 106 of the distributed sensor system 102 can included an onboard, embedded, and/or remotely located computing system configured to control operations of the distributed sensor system 102. According to various embodiments, the functionality of the controller 106 of the distributed sensor system 102 may be provided by one or more server computers, desktop computers, an embedded computing device such as, for example, a base transceiver station ("BTS") and/or a base station controller ("BSC"), combinations thereof, or the like. For purposes of describing the concepts and technologies disclosed herein, the controller 106 of the distributed sensor system 102 is described as an embedded computer system located at the distributed sensor system 102. It should be understood that this embodiment is illustrative, and should not be construed as being limiting in any way.

The controller 106 can be configured to execute an operating system 108 and one or more application programs such as, for example, a data collection application 110. The operating system 108 is a computer program for controlling the operation of the controller 106 and/or the distributed sensor system 102. The data collection application 110 can include an executable program configured to execute on top of the operating system 108 to provide the functionality described herein for obtaining data from a distributed sensor network 100.

According to various embodiments, the data collection application 110 can be configured to control and/or communicate with one or more data sources 112 located at and/or included in the distributed sensor system 102 to obtain information. The information obtained by the data sources 112 can include, but is not limited to, various operating and/or ambient conditions associated with the distributed sensor system 102. Thus, the data sources 112 can include various components of the distributed sensor system 102 such as, for example, sensors, location components, communication components, lighting systems and/or components, imaging systems, sound systems, combinations thereof, or the like. These and other data sources 112 of the distributed sensor system 102 are illustrated and described below with reference to FIG. 2.

The data collection application 110 can receive a data request 114. The data request 114 can be received from various requestors. In some embodiments, the requestor associated with the data request 114 can include, for example, a network data analysis component, a data customer, a network operator, a data analysis system or personnel, combinations thereof, or the like. In some contemplated embodiments, the data request 114 can be received from a data analysis engine 116. The data analysis engine 116 can be executed and/or hosted by a server computer 118 that operates as a part of and/or in communication with the network 104. It should be understood that the data analysis engine 116 also can be hosted by a virtual computing device. As such, the data analysis engine 116 can operate as a service on the network 104. Because the data request 114 can be received from additional and/or alternative systems, applications, and/or devices, it should be understood that this embodiment is illustrative, and should not be construed as being limiting in any way.

The data request 114 can specify and/or list data that is to be collected from the distributed sensor system 102. The data collection application 110 can communicate with the data sources 112 to collect the requested data. The distributed sensor system 102 can perform onboard processing of the data collected from the data sources 112, if desired, and can package the data collected from the data sources 112. The collected and/or processed data can be provided by the data collection application 110 to the data analysis engine 116 within a data response 120. As such, the data collection application 110 can package collected data 122 within the data response 120 and transmit or otherwise provide the data response 120 to the requestor.

As shown in FIG. 1, the data 122 included as or in the data response 120 can include various types of data collected by the data sources 112 of the distributed sensor system 102. For example, the data 122 can include sensor data collected from various sensors such as clocks, richtometers, ultrasound detectors, infrared sensors, other sensors, combinations thereof, or the like. The data 122 also can include ambient condition information obtained from various ambient condition sensors such as thermometers, barometers, anemometers, Geiger counters, air quality detectors and/or exhaust detectors, or the like. As such, the data 122 can include, for example, temperature data, radiation data, wind data such as wind speed and/or direction data, air pressure ("pressure") data.

The data 122 also can include location data for indicating a location of the distributed sensor system 102 and/or for locating other entities such as events by, for example, triangulation of sounds and/or devices, obtaining global positioning system ("GPS") coordinates from devices in communication with the distributed sensor system 102, or the like. The data 122 also can include light and/or lighting data such as ambient lighting conditions and/or status of one or more lighting systems associated with the distributed sensor system 102. The data 122 also can include communication frequency spectrum use and/or availability data ("spectrum data"), utilization data that can describe component and/or resource usage statistics associated with the distributed sensor system 102, and/or operational data that can indicate system and/or component status information. The data 122 also can include other data such as information obtained from hygrometers, pollen counters, strike counters, or the like. As such, the data 122 can include weather information, humidity information, pollen counts, and/or other information.

The data analysis engine 116 can analyze the data 122 for various purposes. In particular, the data analysis engine 116 can be configured to analyze the data 122 to determine conditions at the distributed sensor system 102 and/or at or among a network of multiple distributed sensor systems 102. Thus, for example, some embodiments of the concepts and technologies disclosed herein for a distributed sensor network 100 can include an array of distributed sensor systems 102, which can be located across a geographic area. The data analysis engine 116 can collect and analyze the data 122 from the multiple distributed sensor systems 102 to determine various conditions at the distributed sensor systems 102 and/or across the distributed sensor network 100. Thus, some embodiments of the concepts and technologies disclosed herein can support and/or enable local and/or hyperlocal data collection, analysis, and/or condition determination.

In some embodiments, the collection of weather data, for example, across the distributed sensor network 100 can allow a data analyst and/or the data analysis engine 116 to determine local and/or hyperlocal conditions across a geographic location. Similarly, the data 122 collected by the distributed sensor systems 102 can include network traffic and/or spectrum usage and/or availability at a points distributed across a geographic area. As such, the data analysis engine 116 can be configured to determine, at a high degree of granularity, network and/or user traffic at or near the multiple distributed sensor systems 102, across the distributed sensor network 100, and/or at other locations.

Similarly, the distributed sensor systems 102 can be configured to track and/or determine location of devices or users based upon sound and/or signal information, which can be triangulated by multiple distributed sensor systems 102. As such, some embodiments of the concepts and technologies disclosed herein can support E911 and/or other GPS tracking technologies to a degree of accuracy that may or may not be possible using triangulation at a cellular tower, WI-FI hotspot information, combinations thereof, or the like. The data analysis engine 116 can also be configured to output the results of the data analysis as the output 124. The output 124 can be provided to a data customer, to a data analysis, to network operations, to other entities, combinations thereof, or the like. As such, the data 122 obtained and analyzed by the data analysis engine 116 can be used by a network operator for controlling and/or improving various operational characteristics of the network 104 such as power usage, bandwidth allocation, or the like. The data 122 also can be monetized by collecting and analyzing the data 122, and providing the output 124 to one or more customers.

As mentioned above, FIG. 1 also shows a coverage area 126 associated with the distributed sensor system 102. The coverage area 126 can be relatively small compared to a typical coverage area associated with a macro cell and/or some other wireless communication devices. In some embodiments, for example, the coverage area 126 can have a regular or irregular radius of about ten feet up to about two thousand feet. In some embodiments, the coverage area 126 has a radius of about fifty feet. It can be appreciated that a lighting system, if included in the distributed sensor system 102, can be configured to illuminate some or all of the coverage area 126, if desired. While arrows illustrating communications are shown in FIG. 1 as terminating and/or beginning at the coverage area 126, it should be understood that communications can terminate and/or begin at the distributed sensor system 102 and/or an antenna thereof (not visible in FIG. 1)

FIG. 1 illustrates one distributed sensor system 102, one network 104, and one server computer 118. It should be understood, however, that various implementations of the distributed sensor network 100 include multiple distributed sensor systems 102, multiple networks 104, and/or multiple server computers 118. As such, the illustrated embodiment should be understood as being illustrative, and should not be construed as being limiting in any way.

Figure 2:
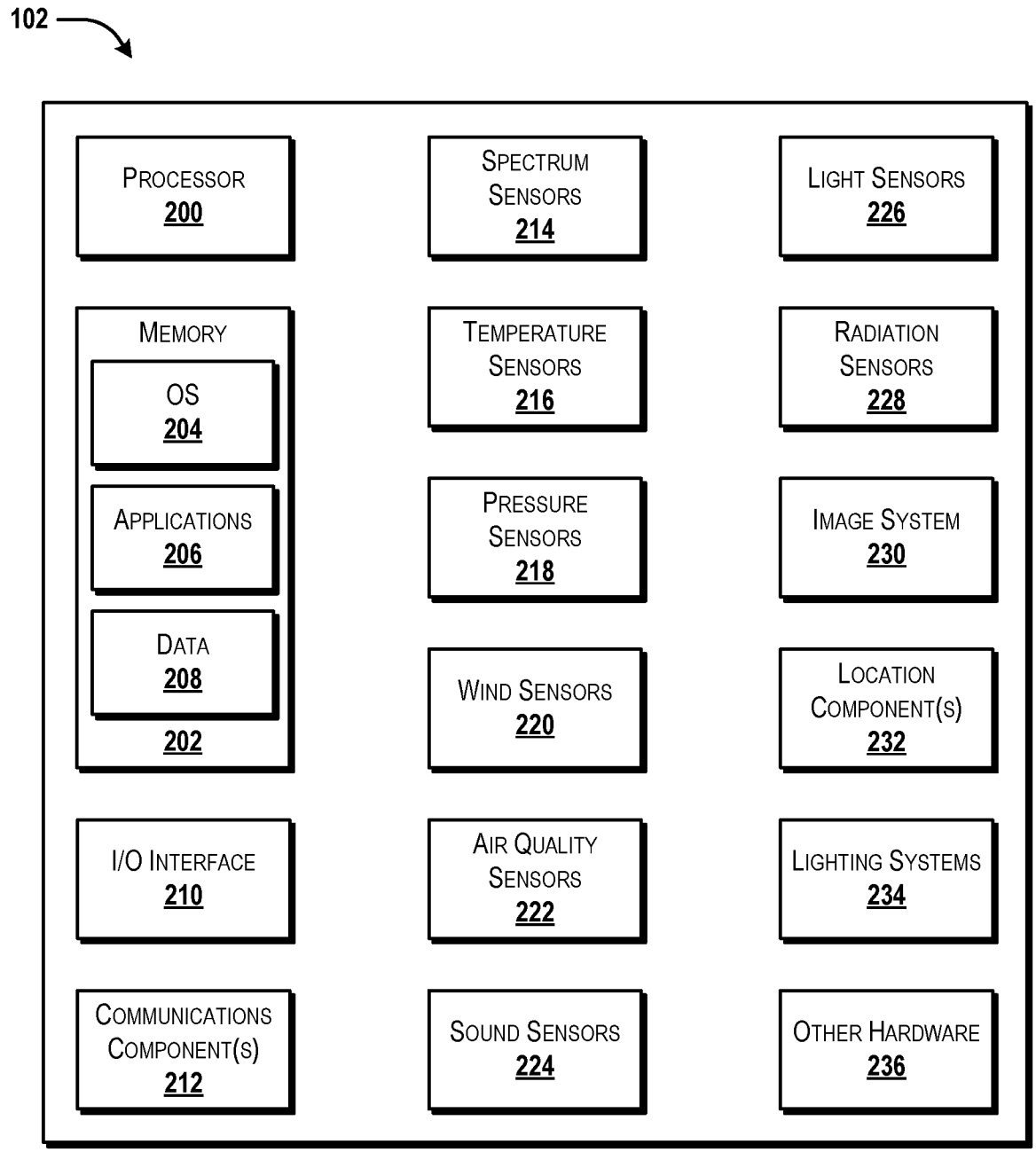
FIG. 2 is a block diagram illustrating an example architecture of a distributed sensor system, according to some illustrative embodiments.

Turning now to FIG. 2, an illustrative architecture of one or more of the distributed sensor systems 102 and components thereof will be described. It should be understood that the distributed sensor system 102 may or may not include some or all of the components and/or associated functionality described herein with reference to FIG. 2. Furthermore, it should be understood that the distributed sensor systems 102 can interact with, collect data from, and/or receive data from various sensors not located at or in the distributed sensor systems 102. For example, the distributed sensor systems 102 can be connected ("hubbed") to remote sensors and/or sensor systems via various wireless and/or wired networks. In some embodiments, the distributed sensor systems 102 communicate with remote sensors and/or sensor systems using machine to machine ("M2M") techniques such as, for example, the IEEE 802.15.4 protocol (e.g., ZIGBEE), various messaging protocols, combinations thereof, or the like. As such, it should be understood that the distributed sensor system 102 and/or various components thereof can communicate via almost any messaging and/or communication protocols.

While connections are not shown between the various components illustrated in FIG. 2, it should be understood that some, none, or all of the components illustrated in FIG. 2 can be configured to interact and/or communicate with one other. In some embodiments, the components are arranged so as to communicate via one or more busses (not shown). Thus, it should be understood that FIG. 2 and the following description are intended to provide a general understanding of a suitable environment in which various aspects of embodiments can be implemented, and should not be construed as being limiting in any way.

As illustrated in FIG. 2, the distributed sensor systems 102 can have an onboard computer or processing system ("processor") 200. It should be understood that the processor 200 can provide the functionality of the controller 106 described above with reference to FIG. 1, though this is not necessarily the case. The distributed sensor system 102 also can include a memory or other data storage device ("memory") 202. The processor 200 can be configured to process data and/or can execute computer-executable instructions stored in the memory 202.

The computer-executable instructions executed by the processor 200 can include, for example, an operating system ("OS") 204 such as the operating system 108 illustrated in FIG. 1 and/or one or more applications 206. In some embodiments, the applications 206 can include the data collection application 110, though this is not necessarily the case. The memory 202 also can store data 208. The data 208 can include, but is not limited to, sensor data, location information, time and/or date information, identification information, other information, combinations thereof, or the like. While FIG. 2 illustrates storage of the OS 204, the applications 206, and the data 208 in the memory 202, it should be understood that the OS 204, the applications 206, the data 208, and/or portions thereof also can be stored in a firmware (not illustrated) and/or other volatile and/or non-volatile data storage devices located at and/or remote from the distributed sensor system 102. A firmware, if included, can be executed by the processor 200 during power up and/or power down operations at the distributed sensor system 102.

The distributed sensor system 102 also can include an input/output ("I/O") interface 210. The I/O interface 210 can be configured to support the input/output of data such as location information, sensor status information (e.g., health, availability, or the like), user information, application initiation (start-up) requests, device control instructions, other data, or the like. In some embodiments, the I/O interface 210 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. As such, the distributed sensor system 102 can allow users to connect to the distributed sensor system 102 for various data retrieval, configuration, and/or other operations.

In some embodiments, the distributed sensor system 102 can be configured to synchronize with one or more devices to transfer content to and/or from the distributed sensor system 102. In some embodiments, for example, the distributed sensor system 102 can be configured to receive the data requests 114 and/or send data responses 120 via the I/O interface 210, though this is not necessarily the case. In some embodiments, the I/O interface 210 accepts I/O devices such as keyboards, keypads, mice, interface tethers, display adapters, printers, plotters, external storage, touch/multi-touch screens, touch pads, trackballs, microphones, remote control devices, displays, projectors, modems, routers, external power sources, docking stations, combinations thereof, and the like. It should be appreciated that the I/O interface 210 may be used for communications between the distributed sensor system 102 and a network device or local device such as, for example, the data sources 112 and/or the server computer 118 shown in FIG. 1.

The distributed sensor system 102 also can include one or more communications components 212. The communications components 212 can be configured to interface with the processor 200 to facilitate wired and/or wireless communications with one or more networks such as the network 104 described herein. In some embodiments, other networks include networks that utilize non-cellular wireless technologies such as WI-FI or WIMAX. For example, the distributed sensor system 102 is configured, in some embodiments, to connect to a backbone of the network 104 and through the network 104 to the server computer 118 and/or other devices via fiber optic connection and/or other types of connections supported by the communications components 212. In some embodiments, the communications component 212 includes a multimode communications subsystem for facilitating communications via the cellular network, a landline network, and/or one or more other networks.

The communications component 212, in some embodiments, includes one or more transceivers. The one or more transceivers, if included, can be configured to communicate over the same and/or different wireless or wired technology standards with respect to one another. For example, in some embodiments one or more of the transceivers of the communications component 212 may be configured to communicate wirelessly using GSM, CDMAONE, CDMA2000, LTE, and/or various other 2G, 2.5G, 3G, 4G, and greater generation technology standards. Moreover, the communications component 212 may facilitate communications over various channel access methods (which may or may not be used by the aforementioned standards) including, but not limited to, TDMA, FDMA, W-CDMA, OFDM, SDMA, and the like.

In addition, the communications component 212 may facilitate data communications using GPRS, EDGE, the HSPA protocol family including HSDPA, EUL or otherwise termed HSDPA, HSPA+, and various other current and future wireless data access standards. The communications component 212 also can communicate using various communications technologies such as, for example, WI-FI, WIMAX, BLUETOOTH, ZIGBEE, infrared, infrared data association ("IRDA"), near field communications ("NFC"), other RF technologies, combinations thereof, and the like. In some embodiments, the communications component 212 also can facilitate reception from terrestrial radio networks, digital satellite radio networks, internet-based radio service networks, combinations thereof, and the like. The communications component 212 can process data from a network such as the Internet, an intranet, a broadband network, a WI-FI hotspot, an Internet service provider ("ISP"), a digital subscriber line ("DSL") provider, a broadband provider, combinations thereof, or the like.

The distributed sensor system 102 also can include multiple sensors. The sensors can include, but are not limited to, one or more spectrum sensors 214, one or more temperature sensors 216, one or more air or ambient environment pressure sensors ("pressure sensors") 218, one or more wind speed and/or wind direction sensors ("wind sensors") 220, one or more air quality sensors 222, one or more sound sensors 224, one or more light level and/or color sensors ("light sensors") 226, one or more radiation sensors 228, or the like.

The spectrum sensors 214 can be configured to monitor usage, utilization, interference, and/or availability of frequency spectrum at or near the distributed sensor system 102. As such, information generated by and/or captured by the spectrum sensors 214 can be used to make adjustments to frequency usage, footprint, power output, and/or other aspects of frequency usage of the distributed sensor system 102. It therefore can be appreciated that by collecting and analyzing spectrum data from a number of distributed sensor systems 102, the data analysis engine 116 can determine spectrum usage, utilization, interference, overlap, and/or availability across the network 104 and/or a portion thereof.

The temperature sensors 216 can be configured to capture temperature information at or near the distributed sensor system 102. As such, information generated by and/or captured by the temperature sensors 216 can be used to determine an air, water, ground, cabinet, or other temperatures. It therefore can be appreciated that by collecting and analyzing temperature data from a number of distributed sensor systems 102, the data analysis engine 116 can determine local and/or hyperlocal temperature information, temperature trends, and/or the like.

The pressure sensors 218 can be configured to determine an air or water pressure at or near the distributed sensor system 102. As such, information generated by and/or captured by the pressure sensors 218 can be used to determine an air or water pressure at or near the distributed sensor system 102. It therefore can be appreciated that by collecting and analyzing pressure data from a number of distributed sensor systems 102, the data analysis engine 116 can determine pressure information across the network 104 and/or a portion thereof.

The wind sensors 220 can be configured to monitor wind speed, wind direction, gust information, and/or the like at or near the distributed sensor system 102. As such, information generated by and/or captured by the wind sensors 220 can be used to determine wind speed, direction, variation, and/or the like at or near the distributed sensor system 102. It therefore can be appreciated that by collecting and analyzing wind data from a number of distributed sensor systems 102, the data analysis engine 116 can determine wind direction, speed, variation, and the like across the network 104 and/or a portion thereof.

The air quality sensors 222 can be configured to monitor air quality at or near the distributed sensor system 102. The air quality sensors 222 can be configured to determine a concentration, in the ambient environment, of particular chemicals such as $CO_2$, CO, or the like. The air quality sensors 222 also can be configured to determine a number of particles per volume, in the air, of particulates such as pollen, dust, insects, or the like. As such, information generated by and/or captured by the air quality sensors 222 can be collected from a number of distributed sensor systems 102 and analyzed at the data analysis engine 116 to determine air quality in an ambient environment across the network 104 and/or a portion thereof.

The sound sensors 224 can be configured to monitor noise levels at or near the distributed sensor system 102. The sound sensors 224 can be configured to measure sound levels and/or frequencies. In some embodiments, multiple distributed sensor systems 102 can measure a sound and its associated noise level to triangulate or otherwise approximate the approximate location of the sound. As such, some embodiments of the concepts and technologies disclosed herein can use one or more distributed sensor systems 102 to identify and locate sounds, to measure ambient sound levels across the network 104 and/or a portion thereof, and/or to otherwise obtain and analyze sound data.

The light sensors 226 can be configured to monitor light levels, intensity levels, colors, and/or other aspects of light at or near the distributed sensor system 102. As such, information generated by and/or captured by the light sensors 226 can be collected from a number of distributed sensor systems 102 and analyzed at the data analysis engine 116 to determine light levels and/or other aspects of light in an ambient environment across the network 104 and/or a portion thereof. In some embodiments, the light data can be used to control outdoor lighting in a local and/or hyperlocal manner based upon measured light levels and/or motion detection at or near the distributed sensor systems 102. It should be understood that this embodiment is illustrative, and should not be construed as being limiting in any way.

The radiation sensors 228 can be configured to monitor radiation levels at or near the distributed sensor system 102. The radiation sensors 228 can include Geiger counters and/or other radiation detection and/or measurement devices configured to identify and measure radiation. The radiation sensors 228 can measure any type of radiation including, but not limited to, infrared and/or ultraviolet ("UV") radiation. As such, information generated by and/or captured by the radiation sensors 228 can be collected from a number of distributed sensor systems 102 and analyzed at the data analysis engine 116 to determine radiation levels in an ambient environment across the network 104 and/or a portion thereof.

The distributed sensor system 102 also can include an image capture and processing system ("image system") 230. The image system 230 can be configured to capture or otherwise obtain photos, videos, and/or other visual information. As such, the image system 230 can include cameras, lenses, charge-coupled devices ("CCDs"), combinations thereof, or the like. The distributed sensor system 102 may also include a video system. The video system can be configured to capture, process, record, modify, and/or store video content. In some embodiments, the distributed sensor system 102 can receive a command to capture images and/or video via a data request 114. As such, the distributed sensor system 102 can support remote image, audio, and/or video capture tasks, though this is not necessarily the case.

The distributed sensor system 102 also can include one or more location components 232. The location components 232 can be configured to send and/or receive signals to determine a geographic location of the distributed sensor system 102. According to various embodiments, the location components 232 can send and/or receive signals from GPS devices and/or systems, assisted-GPS ("A-GPS") devices and/or systems, WI-FI/WIMAX and/or cellular network triangulation data, combinations thereof, and the like. The location component 232 also can be configured to communicate with the communications component 212 to retrieve triangulation data for determining a location of the distributed sensor system 102.

In some embodiments, the location component 232 can interface with cellular network nodes, telephone lines, satellites, location transmitters and/or beacons, wireless network transmitters and receivers, combinations thereof, and the like. Using the location component 232, the distributed sensor system 102 can generate and/or receive data to identify its geographic location, or to transmit the location data to other devices as the data 122 described above for use in determining the geographic location of the distributed sensor system 102 and/or one or more devices in communication with the distributed sensor system 102. The location component 232 may include multiple components for determining the location and/or orientation of the distributed sensor system 102 and/or a device in communication therewith.

The distributed sensor system 102 also can include lighting systems 234. The lighting systems 234 can include, but are not limited to, light fixtures, photo cells, motion detectors, and/or other lighting equipment. In one contemplated embodiment, the lighting equipment includes LED lighting. As such, some embodiments of the concepts and technologies disclosed herein can include a distributed sensor environment that can include an integrated eco-friendly lighting system, cellular and/or other types of wireless communications transceivers, and/or data sensors for measuring lighting levels, motion detection, and/or other aspects of the lighting for analysis and/or control by various systems and/or entities. While the example of LED lighting is provided above, it should be understood that some other embodiments of the lighting systems 234 can include other lighting technologies such as incandescent lighting, fluorescent lighting, sodium lighting, mercury lighting, halogen lighting, other lighting technologies, combinations thereof, or the like.

The illustrated distributed sensor system 102 also can include other hardware 236. The other hardware 236 can include, for example, solar cells, a pole and/or other mounting hardware, power sources such as, for example, one or more batteries, power supplies, power cells, and/or other power subsystems including alternating current ("AC") and/or direct current ("DC") power devices, antennas, heat shields, bug and/or pest shields, or the like. The other hardware 236 also can include a radome that can cover one or more of the various components of the distributed sensor system 102. The radome can also shields the components from the elements, but can allow radio frequency to penetrate the radome, thereby protecting the distributed sensor systems 102 from the elements while not affecting performance of the distributed sensor system 102. The other hardware 236 also can include external power systems or charging equipment; environmental control devices such as air conditioners, heat pumps, heat generators, resistance heaters, and/or other heating and/or cooling systems; fans, heat exchangers, ductwork, and/or other heat control structures or devices; combinations thereof; or the like. Because the distributed sensor system 102 can include additional and/or alternative components, the above embodiment should be understood as being illustrative of one possible operating environment for various embodiments of the concepts and technologies described herein. As such, the described embodiment of the distributed sensor system 102 is illustrative, and should not be construed as being limiting in any way.

Figure 3:
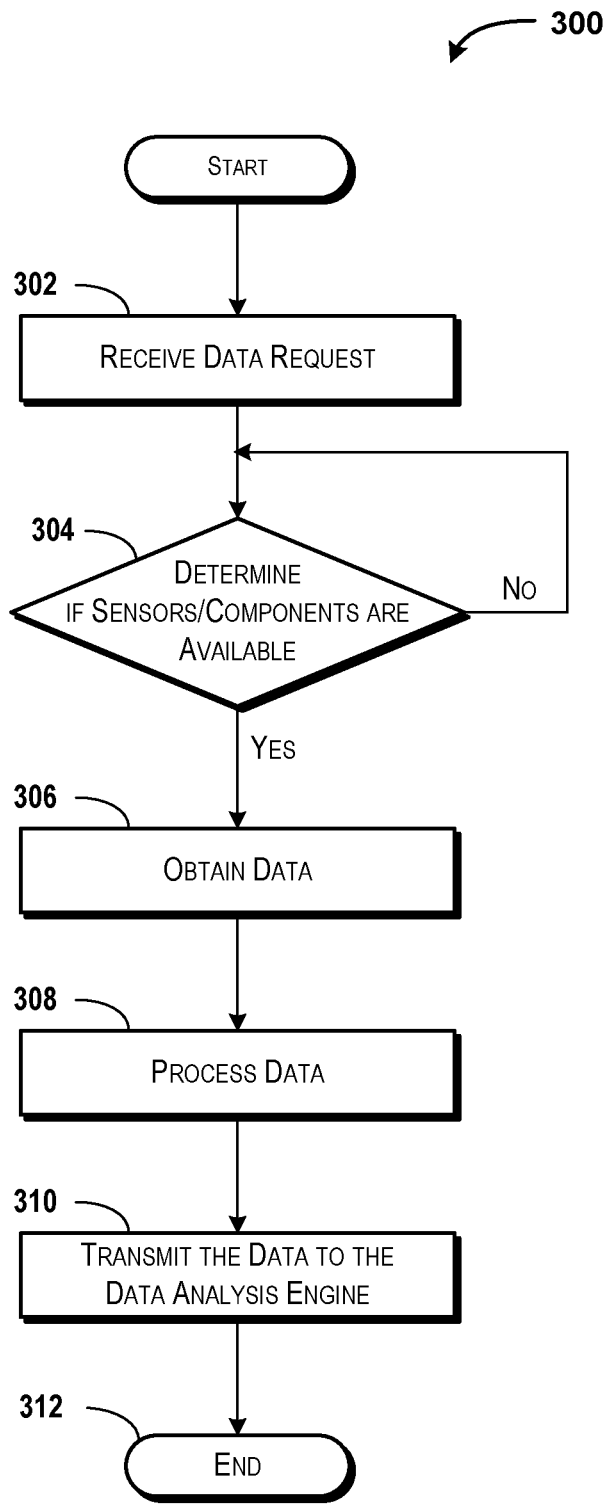
FIG. 3 is a flow diagram showing aspects of a method for collecting data at a distributed sensor system, according to an illustrative embodiment.

Turning now to FIG. 3, aspects of a method 300 for collecting data at a distributed sensor system 102 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, the distributed sensor system 102 and/or the server computer 118 to perform one or more operations and/or causing the processor to direct other components of the computing system or device to perform one or more of the operations.

For purposes of illustrating and describing the concepts of the present disclosure, the methods disclosed herein are described as being performed by the distributed sensor system 102 via execution of one or more software modules such as, for example, the data collection application 110. It should be understood that additional and/or alternative devices and/or network nodes can provide the functionality described herein via execution of one or more modules, applications, and/or other software including, but not limited to, the data collection application 110. Thus, the illustrated embodiments are illustrative, and should not be viewed as being limiting in any way.

The method 300 begins at operation 302, wherein the distributed sensor system 102 receives a data request 114. The distributed sensor system 102 can receive the data request 114 from a requestor such as, for example, the data analysis engine 116. The data request 114 can specify a particular instance of data requested by the requestor, a type or category of data requested by the requestor, and/or various instances and/or types of data requested by the requestor. For example, the data request 114 can request, for example, environmental data conditions, which may include air temperature, air pressure, ambient lighting, sound levels, wind speed, wind direction, humidity, and/or other environmental conditions. The data request 114 alternatively may request temperature data. As such, it should be understood that the data request 114 can specify almost any instances and/or types of data from the distributed sensor systems 102.

From operation 302, the method 300 proceeds to operation 304, wherein the distributed sensor system 102 determines if one or more data sources 112 are available. In particular, the distributed sensor system 102 can determine if one or more data sources 112 that are to be used to obtain the data requested by the data request 114 are available. In the example above, wherein the data request 114 can correspond to a request for temperature data, the distributed sensor system 102 can determine if a thermometer or other temperature measurement device is available. Thus, it can be appreciated that the distributed sensor system 102 can be configured to recognize the data sources 112 that will satisfy the data request 114, as well as determine if the data sources 112 are available. Furthermore, it should be understood that the distributed sensor system 102 can obtain the data from the data sources 112 via a buffer, cache, or other data storage device configured to obtain and store the data. As such, the distributed sensor system 102 can be configured to determine, in operation 304, if the data is stored in a data storage device in addition to, or instead of, determining if the data sources 112 are available. It should be understood that this embodiment is illustrative, and should not be construed as being limiting in any way.

If the distributed sensor system 102 determines, in operation 304, that the one or more data sources 112 to be used to satisfy the data request 114 received in operation 302 are not available, the method 300 can return to operation 304.

The distributed sensor system 102 may determine that the data sources 112 are unavailable, for example, if the data sources 112 are capturing data associated with another data request 114, if one or more of the data sources 112 is offline, or the like. As such, it can be appreciated that in some embodiments, execution of the method 300 can repeat and/or pause until the distributed sensor system 102 determines, in any iteration of operation 304, that the one or more data sources 112 to be used to obtain the data requested in the data request 114 are available. If the distributed sensor system 102 determines, in any iteration of operation 304, that the one or more data sources 112 are available, the method 300 proceeds to operation 306.

In operation 306, the distributed sensor system 102 obtains the data from the data sources 112. In particular, the distributed sensor system 102 can execute the data collection application 110 to obtain the data from the data sources 112. Thus, for example, the data collection application 110 can activate one or more of the data sources 112 and/or can generate instructions for activating the one or more data sources 112, and obtain or receive the data generated by the data sources 112. According to various embodiments, the data obtained from the data sources 112 can include many different instances and/or types of data such as, for example, the data illustrated and described above with reference to FIGS. 1-2, as well as other instances and/or types of data. It should be understood that these embodiments are illustrative, and should not be construed as being limiting in any way.

From operation 306, the method 300 proceeds to operation 308, wherein the distributed sensor system 102 can perform onboard processing of the data obtained in operation 306, if desired. In some embodiments, the distributed sensor system 102 may or may not perform onboard processing such as, for example, compression of data and/or data files, conversion to or from various file formats, other file size and/or file format management operations, combinations thereof, or the like. The distributed sensor systems 102 also can package some data and/or format the data into particular data structures such as, for example, matrices, data tables, or the like, for representing multiple instances of the data and/or for other reasons. Because the data may not be processed by the distributed sensor system 102 and instead can be used or provided to other systems as raw data, it should be understood that these embodiments are illustrative, and should not be construed as being limiting in any way.

From operation 308, the method 300 proceeds to operation 310, wherein the distributed sensor system 102 transmits the data to the data analysis engine 116. The data can be provided to the data analysis engine 116 in a data response 120, if desired, and/or can be made available to the data analysis engine 116. In some embodiments, the data response 120 can include the data 122 as explained above with reference to FIG. 1. As such, the data transmitted or provided to the data analysis engine 116 in operation 310 can include various types of data and/or any number of instances of data.

From operation 310, the method 300 proceeds to operation 312. The method 300 ends at operation 312.

Figure 4:
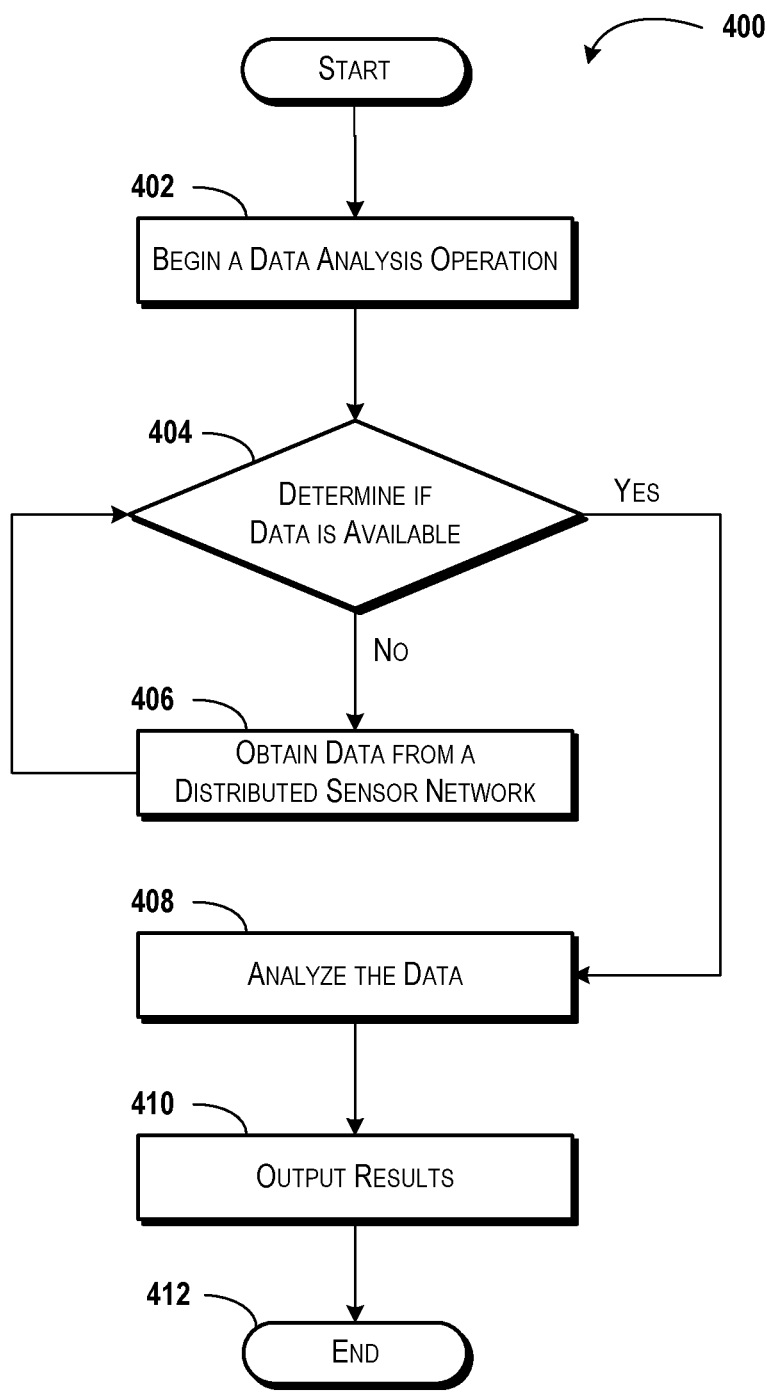
FIG. 4 is a flow diagram showing aspects of a method for obtaining and analyzing data in a distributed sensor network, according to another illustrative embodiment.

Turning now to FIG. 4, aspects of a method 400 for obtaining and analyzing data in a distributed sensor network will be described in detail, according to an illustrative embodiment. For purposes of illustrating and describing the concepts of the present disclosure, the methods disclosed herein are described as being performed by the server computer 118 via execution of one or more software modules such as, for example, the data analysis engine 116. It should be understood that additional and/or alternative devices and/or network nodes can provide the functionality described herein via execution of one or more modules, applications, and/or other software including, but not limited to, the data analysis engine 116. Thus, the illustrated embodiments are illustrative, and should not be viewed as being limiting in any way.

The method 400 begins at operation 402, wherein the server computer 118 begins a data analysis operation. The data analysis operation begun in operation 402 can correspond to a timed data collection/analysis job, a requested data analysis operation, and/or an analysis begun on data in response to receiving the data from one or more distributed sensor systems 102. In some embodiments, for example, the server computer 118 can execute a timer job to initiate data analysis and/or data collection, as will be explained in more detail below. As such, although not explicitly illustrated in FIG. 4, operation 402 can include determining that a timer has expired and initiating a data collection and/or analysis operation in response to such a determination.

The data analysis operation begun in operation 402 also can be initiated by the server computer 118 in response to receiving a data analysis request from a requestor such as, for example, a data customer, a network operator, a network control mechanism, and/or other applications, modules, entities, systems, or the like. Thus, operation 402 can include receiving a request and initiating the data analysis operation in response to receiving the request. Because analysis of the data as described herein can be initiated in response to additional and/or alternative considerations, it should be understood that these embodiments are illustrative, and should not be construed as being limiting in any way.

From operation 402, the method 400 proceeds to operation 404, wherein the server computer 118 determines if data to be analyzed by the server computer 118 is available. The server computer 118 can determine if data to be analyzed in the data analysis operation begun in operation 402 is available. Thus, for example, if a data analysis request is received for determining weather conditions at or near one or more of the distributed sensor systems 102 and/or across the network 104, the server computer 118 can determine if weather data is available. As explained above with regard to FIGS. 1-2, weather data may include, but is not limited to, temperature data, wind data, pressure data, humidity data, light data, strike counter data, other data, combinations thereof, or the like. As such, operation 404 can include the server computer 118 determining what data is needed or desired for the data analysis operation begun in operation 402 as well as determining if the data is available.

In some embodiments, the server computer 118 can store data such as the data 122 received from the distributed sensor systems 102 in a data storage device such as a memory, hard drive, network storage device, and/or other local and/or remote virtual and/or real data storage devices. As such, operation 404 can include accessing a local or remote data storage device to determine if the data is available. Because other approaches for determining if the data to be used is available are contemplated, it should be understood that these embodiments are illustrative, and should not be construed as being limiting in any way.

If the server computer 118 determines, in operation 404, that the data to be analyzed by the server computer 118 is not available, the method 400 proceeds to operation 406. In operation 406, the server computer 118 can obtain the data to be analyzed by the server computer 118. According to various embodiments, the server computer 118 can determine what data is needed and/or desired for the data analysis, format a request such as the data request 114 described with reference to FIG. 1, send the data request 114 to one or more distributed sensor systems 102, and receive data from the distributed sensor systems 102 such as, for example, the data 122 included in the data response 120 described above.

In some other embodiment, the server computer 118 can be configured to access the sensors and/or systems of the distributed sensor systems 102 without generating and/or transmitting the data requests 114 described herein. As such, operation 406 can include the server computer 118 accessing one or more data sources 112 of the distributed sensor systems 102 to obtain the data 122 and/or other information. Because the data can be obtained by generating instructions or requests for other devices, it should be understood that these embodiments are illustrative, and should not be construed as being limiting in any way.

From operation 406, the method 400 returns to operation 404. As such, operations 404-406 can be repeated until the server computer 118 determines, in any iteration of operation 404, that data to be analyzed is available. If the server computer 118 determines, in any iteration of operation 404, that the data to be analyzed is available, the method 400 proceeds to operation 408.

At operation 408, the server computer 118 analyzes the data. The data analysis can include various operations. In some embodiments, the server computer 118 can collect data from across multiple distributed sensor systems 102 and perform various operations for analyzing the data to determine conditions across the network 104, conditions at one or more of the distributed sensor systems 102, and/or conditions at or across the distributed sensor network 100, or the like.

The analysis of operation 408 can vary based upon the type of data analysis operation begun in operation 402. Thus, for example, if a data customer, network operation, or other entity requests a report or analysis of network traffic, the server computer 118 can obtain utilization and/or resource availability information from one or more of the distributed sensor systems 102. The data can be analyzed to determine usage at or near various distributed sensor systems 102, usage across the network 104, and/or usage across the entire and/or portions of the distributed sensor network 100.

As explained in detail above, the data collected from the distributed sensor network 100 can include various types of information collected from various data sources 112 that can include sensors, systems, and/or components of the distributed sensor systems 102. As such, the data analysis in operation 408 can include analysis of various types and/or categories of data, various data operations that may be specific to the particular type and/or categories of data being analyzed, and/or other operations such as mathematical and/or statistical manipulation of values, averages, means, or the like. Thus, the above examples of data analysis should be understood as being illustrative and should not be construed as being limiting in any way.

From operation 410, the method 400 proceeds to operation 412, wherein the server computer 118 outputs results. In particular, the server computer 118 can output the results of the data analysis of operation 408 as the output 124. As explained in detail herein, the output 124 can be exposed by the server computer 118 to data customers, network operators, network control devices and/or systems, data storage devices, users, and/or other entities. The server computer 118 also can be configured to transmit the output 124 to various devices, to store the output 124 in a data storage device, to persist the output 124 in a cache or other volatile storage device, or the like.

In some embodiments, the server computer 118 also can be configured to notify a billing or charging module or system of the output 124. As such, the server computer 118 can be configured to generate or request charges for a recipient of the output 124. In some embodiments, for example, the output 124 can be sold for a charge to weather reporters, news organizations, utility companies, network operators, municipalities, traffic control organizations and/or systems, other entities, or the like. Thus, the server computer 118 can be configured to report generation of the output 124 for purposes of enabling monetization of the data analysis described herein. Because consumers of the output 124 can be charged and/or billed in other ways and/or for other reasons, it should be understood that this embodiment is illustrative, and should not be construed as being limiting in any way.

From operation 412, the method 400 proceeds to operation 414. The method 400 ends at operation 414.

Figure 5:
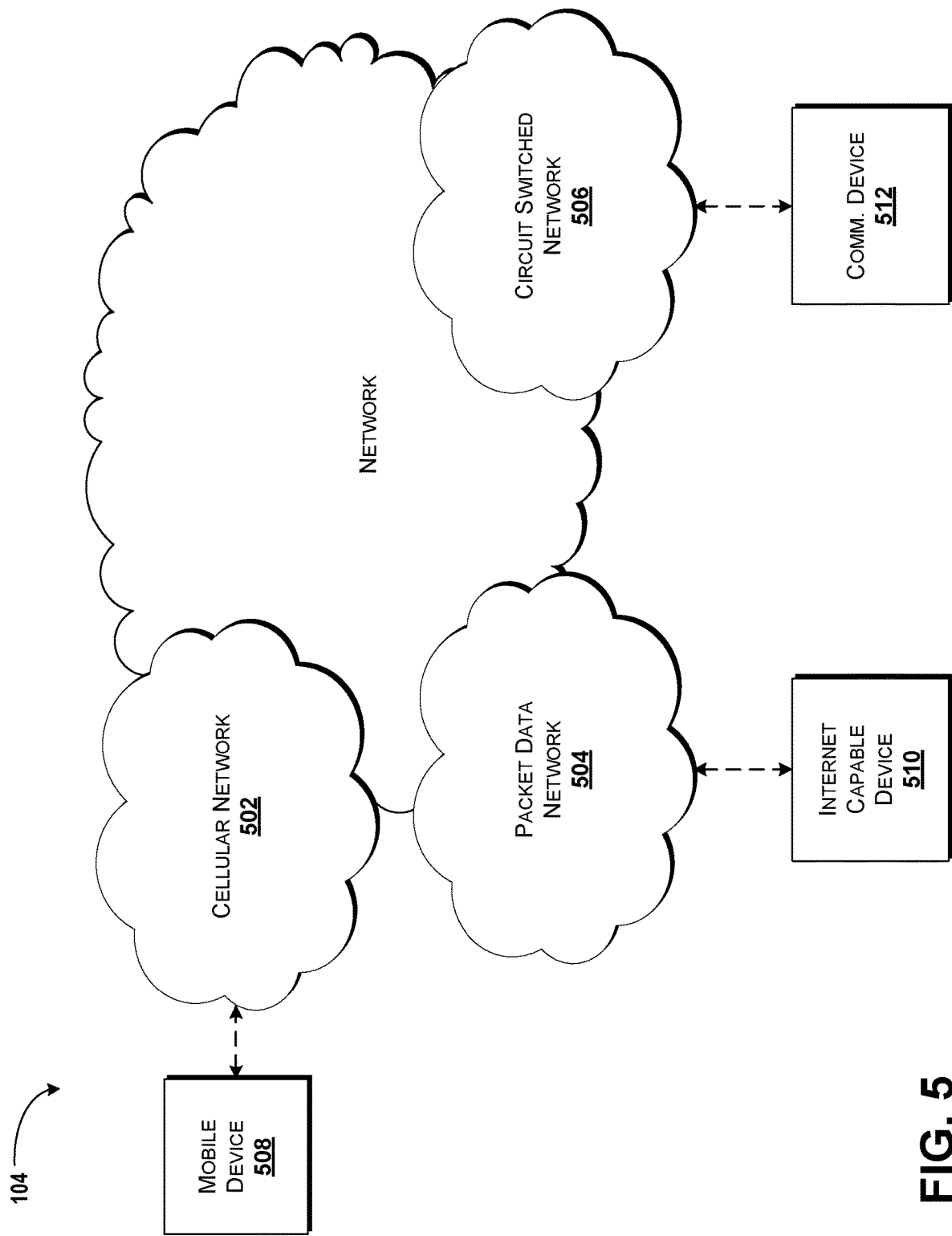
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
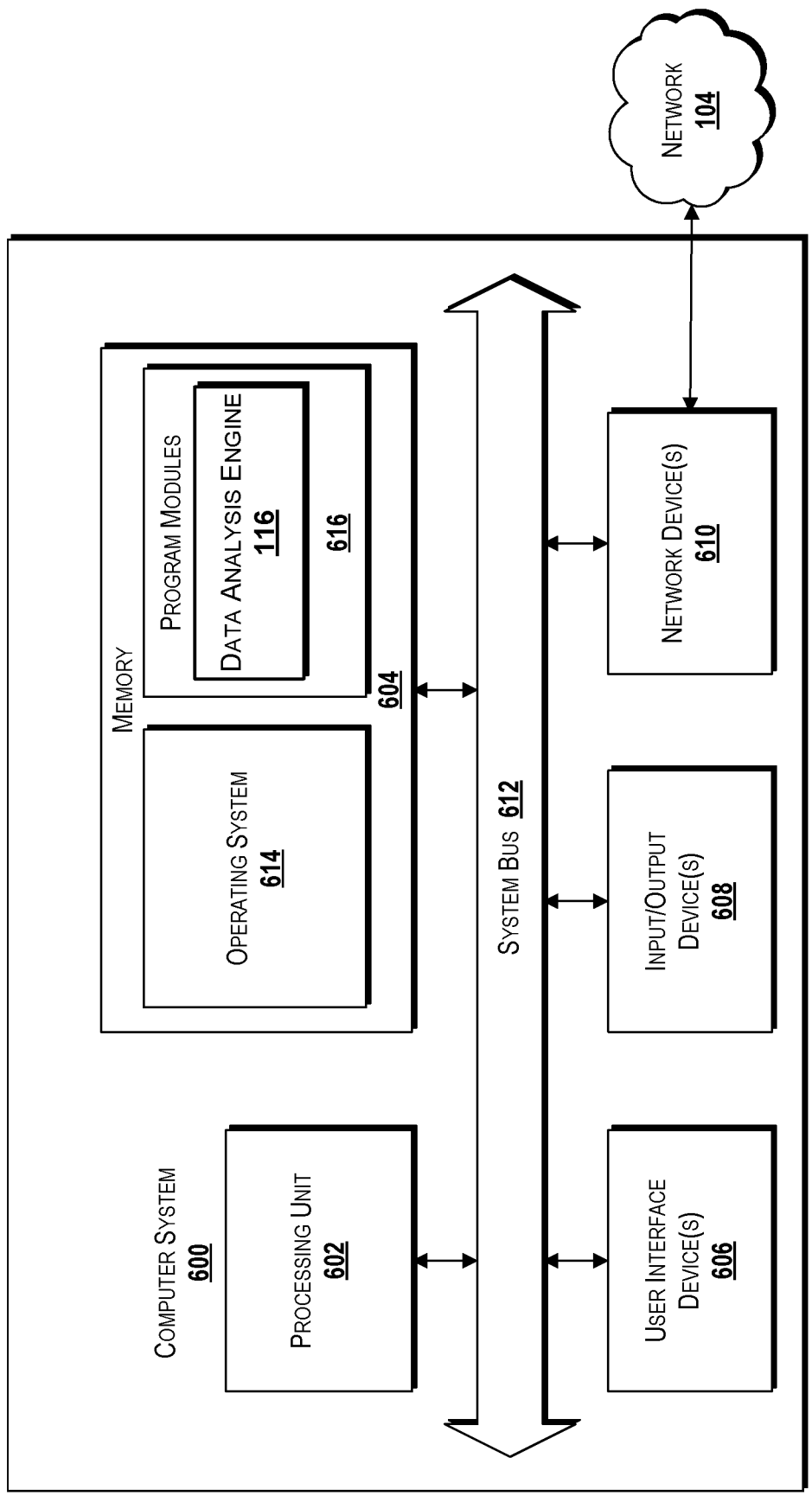
FIG. 6 is a block diagram illustrating an example computer system configured to collect and analyze data in a distributed sensor network, according to some illustrative embodiments.

FIG. 6 is a block diagram illustrating a computer system 600 configured to provide the functionality described herein for a verification service, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the data analysis engine 116. This and/or other programs can be embodied in computer-readable media containing instructions that, when executed by the processing unit 602, perform one or more methods including, but not limited to, the method 400 described in detail above with respect to FIG. 4. According to embodiments, the program modules 616 may be embodied in hardware, software, firmware, or any combination thereof. Although not shown in FIG. 6, it should be understood that the memory 604 also can be configured to store the data 122, the output 124, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof, does not include waves, signals, and/or other transitory and/or intangible communication media, per se.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as a BLUETOOTH peer-to-peer connection, a ZIGBEE connection, a Wireless Metropolitan Area Network ("WMAN") such a WiMAX network, a cellular network, combinations thereof, or the like. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for collecting and analyzing data in a distributed sensor network have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein. As used in the claims, a distributed sensor system includes at least a memory, a processor, a radome, and at least one of the sensors described herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A system comprising:
a processor;
a distributed sensor system; and
a memory that stores computer-executable instructions that, when executed by the processor, cause the processor to perform operations comprising
determining whether data for analysis during a data analysis operation is available,
in response to a determination that the data is not available, requesting the data from the distributed sensor system, wherein the distributed sensor system comprises a plurality of data sources, a communications component that supports cellular communications in a coverage area associated with the distributed sensor system, and a lighting system located within a radome, wherein the lighting system comprises a light fixture that is configured to illuminate a portion of the coverage area that is outside the radome,
analyzing the data in the data analysis operation, and
outputting results of the data analysis operation.

2. The system of claim 1, wherein requesting the data from the distributed sensor system comprises:
generating a data request specifying the data;
transmitting the data request to the distributed sensor system; and
receiving the data from the distributed sensor system.

3. The system of claim 1, wherein outputting the results of the data analysis operation comprises outputting the results to a data analysis engine that is configured to analyze sound data collected by sound sensors of the distributed sensor system to measure ambient sound levels at the distributed sensor system.

4. The system of claim 1, wherein outputting the results of the data analysis operation comprises outputting the results to a data analysis engine that is configured to analyze the data to determine traffic conditions associated with a geographic location that corresponds to the distributed sensor system.

5. The system of claim 1, wherein outputting the results of the data analysis operation comprises outputting the results to a data analysis engine that is configured to analyze sound data collected by sound sensors of the distributed sensor system to identify and locate sounds near the distributed sensor system.

6. The system of claim 1, wherein outputting the results of the data analysis operation comprises outputting the results to a data analysis engine that is configured to analyze the data to determine weather conditions associated with a geographic location that corresponds to the distributed sensor system.

7. The system of claim 1, wherein outputting the results of the data analysis operation comprises outputting location information associated with devices that communicate with the distributed sensor system.

8. A method comprising:
requesting, by a server computer that executes a data analysis engine, data from a distributed sensor system, wherein the distributed sensor system comprises a plurality of data sources, a communications component that supports cellular communications in a coverage area associated with the distributed sensor system, and a lighting system located within a radome, wherein the lighting system comprises a light fixture that is configured to illuminate a portion of the coverage area that is outside the radome;
analyzing, at the server computer, the data in a data analysis operation; and
outputting, at the server computer, results of the data analysis operation.

9. The method of claim 8, further comprising receiving a request to analyze the data.

10. The method of claim 8, wherein the data comprises data collected from a sensor of the distributed sensor system.

11. The method of claim 8, wherein the data comprises temperature data, pressure data, wind data, and radiation data, and wherein outputting the results of the data analysis operation comprises outputting the results to a data analysis engine that is configured to analyze the data to determine weather conditions associated with a geographic location that corresponds to the distributed sensor system.

12. The method of claim 8, wherein requesting the data comprises: generating a data request specifying the data;
transmitting the data request to the distributed sensor system; and
receiving the data from the distributed sensor system.

13. The method of claim 12, wherein the data request specifies a category of data to be collected by the distributed sensor system, the category of data comprising a plurality of instances of data.

14. The method of claim 8, wherein outputting the results of the data analysis operation comprises outputting the results to a data analysis engine that is configured to analyze the data to determine traffic conditions associated with a geographic location that corresponds to the distributed sensor system.

15. The method of claim 8, wherein requesting the data from the distributed sensor system comprises:
identifying data to be analyzed during the data analysis operation;
generating a data request specifying the data;
transmitting the data request to the distributed sensor system; and
receiving the data from the distributed sensor system.

16. A computer storage medium having computer-executable instructions stored thereon that, when executed by a processor, cause the processor to perform operations comprising:
requesting data from a distributed sensor system, wherein the distributed sensor system comprises a plurality of data sources, a communications component that supports cellular communications in a coverage area associated with the distributed sensor system, and a lighting system located within a radome, wherein the lighting system comprises a light fixture that is configured to illuminate a portion of the coverage area that is outside the radome;
analyzing the data in a data analysis operation; and
outputting results of the data analysis operation.

17. The computer storage medium of claim 16, wherein requesting the data comprises:
generating a data request specifying the data;
transmitting the data request to the distributed sensor system; and
receiving the data from the distributed sensor system in a data response.

18. The computer storage medium of claim 16, wherein outputting the results of the data analysis operation comprises outputting the results to a data analysis engine that is configured to analyze the data to determine traffic conditions associated with a geographic location that corresponds to the distributed sensor system.

19. The computer storage medium of claim 17, wherein outputting the results of the data analysis operation comprises outputting the results to a data analysis engine that is configured to analyze the data to determine weather conditions associated with a geographic location that corresponds to the distributed sensor system.

20. The computer storage medium of claim 16, wherein the computer-executable instructions, when executed by the processor, cause the processor to perform operations further comprising generating an instruction to charge a recipient of the results of the data analysis operation.

* * * * *